United States Patent
Dierssen et al.

(10) Patent No.: US 8,365,579 B2
(45) Date of Patent: Feb. 5, 2013

(54) KNOCK DETECTION SYSTEM AND METHOD FOR AN AMPLIFIER CONTROL FOR A KNOCK SIGNAL

(75) Inventors: Kai Dierssen, Karlsruhe (DE); Stefan Kempf, Vaihingen-Kleinglattbach (DE); Jochen Goebels, Duesseldorf (DE); Federico Buganza, Esslingen (DE); Anton Kantschar, Eberdingen (DE); Frédéric Gabel, Ludwigsburg (DE); Carsten Kluth, Stuttgart (DE); Oskar Torno, Schwieberdingen (DE); Werner Haeming, Neudenau (DE); Robert Sloboda, Muehlacker-Muehlhausen (DE); Jan Boettger, Markgroeningen (DE); Rudi Eichhorn, Stuttgart (DE); Andreas Meinken, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 12/733,991

(22) PCT Filed: Sep. 24, 2008

(86) PCT No.: PCT/EP2008/062739
§ 371 (c)(1),
(2), (4) Date: Nov. 1, 2010

(87) PCT Pub. No.: WO2009/050002
PCT Pub. Date: Apr. 23, 2009

(65) Prior Publication Data
US 2011/0030452 A1    Feb. 10, 2011

(30) Foreign Application Priority Data
Oct. 12, 2007   (DE) .......................... 10 2007 049 150

(51) Int. Cl.
*G01L 23/22* (2006.01)
(52) U.S. Cl. ..................................... 73/35.01; 73/35.05
(58) Field of Classification Search ................ 73/35.01, 73/35.05
See application file for complete search history.

(56) References Cited

U.S. PATENT DOCUMENTS

| 4,153,020 | A | * | 5/1979 | King et al. ............... 123/406.39 |
| 4,425,891 | A | | 1/1984 | Kashimura et al. |
| 4,478,068 | A | * | 10/1984 | Bonitz et al. ................. 73/35.04 |
| 4,565,087 | A | * | 1/1986 | Damson et al. .............. 73/35.04 |
| 5,205,258 | A | * | 4/1993 | Hashimoto et al. ...... 123/406.37 |
| 5,419,180 | A | * | 5/1995 | Yamada et al. .............. 73/35.05 |

(Continued)

FOREIGN PATENT DOCUMENTS

| DE | 44 09 103 | 9/1994 |
| DE | 10 138 110 | 3/2002 |

(Continued)

*Primary Examiner* — Freddie Kirkland, III
(74) *Attorney, Agent, or Firm* — Kenyon & Kenyon LLP

(57) ABSTRACT

An apparatus for furnishing an amplified sensor signal of a knock sensor, encompassing an analog amplifier for amplifying the sensor signal in accordance with a first definable gain factor; an analog/digital converter for digitizing the amplified sensor signal into a digitized sensor signal; a digital amplifier for amplifying the digitized sensor signal in accordance with a second definable gain factor; and a control unit in order to furnish the first and the second gain factor as a function of a baseline sound level of the sensor signal, the baseline sound level corresponding to the component of the solid-borne sound signal generated in normal operation without knocking.

9 Claims, 2 Drawing Sheets

U.S. PATENT DOCUMENTS

| | | | | |
|---|---|---|---|---|
| 6,550,311 B2 * | 4/2003 | Sloboda | | 73/35.04 |
| 7,254,475 B1 * | 8/2007 | Grai et al. | | 701/111 |
| 2004/0239421 A1 | 12/2004 | Wang et al. | | |
| 2009/0288476 A1 * | 11/2009 | Buganza et al. | | 73/35.05 |
| 2010/0106392 A1 * | 4/2010 | Charrier et al. | | 701/111 |

FOREIGN PATENT DOCUMENTS

| | | |
|---|---|---|
| EP | 1 126 261 | 8/2001 |
| JP | 57 203862 | 12/1982 |
| JP | 60-35238 | 2/1985 |

* cited by examiner

KNOCK DETECTION SYSTEM AND METHOD FOR AN AMPLIFIER CONTROL FOR A KNOCK SIGNAL

FIELD OF THE INVENTION

The present invention relates to a knock detection system for use with a combustion engine, e.g. in a motor vehicle. The invention further relates to a method for gain control for an amplifier assemblage for amplifying the sensor signal of a knock sensor.

BACKGROUND INFORMATION

The solid-borne sound signal that is used for knock control in a combustion engine varies considerably in amplitude over the entire load and rotation-speed range of the combustion engine, because of changes in the engine's baseline noise. The solid-borne sound signal is sensed by a knock sensor, which outputs a sensor signal that is very small (usually a few mV) in the rotation speed range close to idle, and is in the range of, for example, a volt at full load and rated speed. Signal evaluation of the sensor signal is accomplished in a control unit; in order to evaluate the sensor signal, the control unit must ensure that in the low-signal range, the sensor signal is still resolved with sufficiently high accuracy that it can be filtered. In addition, in the high-signal range the sensor signal should require only part of the available evaluation range, so that knocking combustion events, which are detected as a sensor signal amplitude that is elevated with respect to the baseline signal level, do not exceed the detection range for signal evaluation, with the result that signal components important for knock detection would be lost.

In order to ensure sufficient resolution over the entire amplitude range of the solid-borne sound signal, the sensor signals of the knock sensor are amplified or not amplified as a function of the magnitude of the solid-borne sound signal and as a function of the rotation speed of the combustion engine. Gain control of this kind amplifies the voltage signals when the solid-borne sound signals are small, and processes the voltage signals neutrally when the solid-borne sound signals are large.

The document DE 10 138 110 A1 discusses a method and an apparatus for knock detection and knock control, in which a sensor signal of a knock sensor is delivered to an amplifier and amplified therein in accordance with the need for further evaluation. The amplified signal is forwarded to an adjustable bandpass filter by selecting a frequency band in which the frequencies characteristic of knocking are located. Interference signals that are located in a different range can be effectively blocked out as a result of this bandpass filtration.

Adjustable amplifiers that make available two or more different gain factors, in order to amplify the sensor signal into an optimum signal-level range for signal evaluation in an analog/digital converter, have hitherto been provided for adaptation of the sensor signal. Implementing an adjustable amplifier of this kind for the analog sensor signal using discrete circuit technology is, however, complex and error-prone, in particular when two or more gain factors need to be implemented.

It is therefore an object of the exemplary embodiments and/or exemplary methods of the present invention to make available a knock detection system as well as a method for furnishing an amplified sensor signal of a knock sensor for operating a knock detector system, the outlay for implementing the amplifier for amplifying the sensor signal of the knock sensor being reduced. A further object of the exemplary embodiments and/or exemplary methods of the present invention is to make available a method for furnishing an amplified sensor signal with which a knock detection system of this kind can be operated.

SUMMARY OF THE INVENTION

This object may be achieved by the apparatus as described herein, and by the knock detection system and the method for operating a knock detection system in accordance with the disclosure herein.

Further advantageous embodiments of the invention are also described herein.

According to a first aspect, an apparatus for furnishing an amplified sensor signal of a knock sensor is provided. The apparatus encompasses an analog amplifier for amplifying the sensor signal in accordance with a first definable gain factor; an analog/digital converter for digitizing the amplified sensor signal into a digitized sensor signal; a digital amplifier for amplifying the digitized sensor signal in accordance with a second definable gain factor; and a control unit in order to furnish the first and the second gain factor as a function of a baseline sound level of the sensor signal, the baseline sound level corresponding to the component of the solid-borne sound signal generated in normal operation without knocking.

The aforesaid apparatus enables simpler implementation of the first amplifier, which is usually embodied exclusively as a hardware amplifier, since the number of gain factors to be implemented by way of the hardware amplifier can be reduced.

In addition, the control unit can be embodied to select a total gain as a function of a baseline sound level of the sensor signal.

In particular, the control unit can be embodied to decrease the total gain when the baseline sound level exceeds an upper threshold value, and to increase it when the baseline sound level falls below a lower threshold value.

According to a further embodiment, the control unit has a memory that contains an allocation table with which the total gain can be allocated to the baseline sound level of the sensor signal.

In addition, a first number of defined gain factors can be selectable as first gain factors, a second number of defined gain factors being selectable as second gain factors, the smallest factor occurring between two of the defined first gain factors being greater than the smallest factor occurring between two of the defined second gain factors. In other words, the intervals between the first gain factors are larger than the intervals between the second gain factors.

According to a further aspect, a knock detection system is provided, having a knock detection unit for detecting a knock and for furnishing a baseline sound level of the sensor signal, and having one of the aforesaid apparatuses.

According to a further aspect, a method is provided for furnishing an amplified sensor signal of a knock sensor for operating a knock detection system. The method encompasses the steps of: furnishing a sensor signal; amplifying the sensor signal in accordance with a first definable gain factor; digitizing the amplified sensor signal into a digitized sensor signal; amplifying the digitized sensor signal in accordance with a second definable gain factor; and furnishing the first and the second gain factor as a function of a baseline sound level of the sensor signal, the baseline sound level corresponding to the component of the solid-borne sound signal generated in normal operation without knocking.

A total gain can furthermore be selected as a function of a baseline sound level of the sensor signal, the total gain being decreased when an upper threshold value is exceeded, and increased when the level falls below a lower threshold value.

According to a further aspect, a computer program is provided that contains a program code which, when it is executed on a data processing unit, carries out the aforesaid method.

Embodiments of the present invention will be explained in further detail below with reference to the appended drawings.

DETAILED DESCRIPTION

Figure 1:
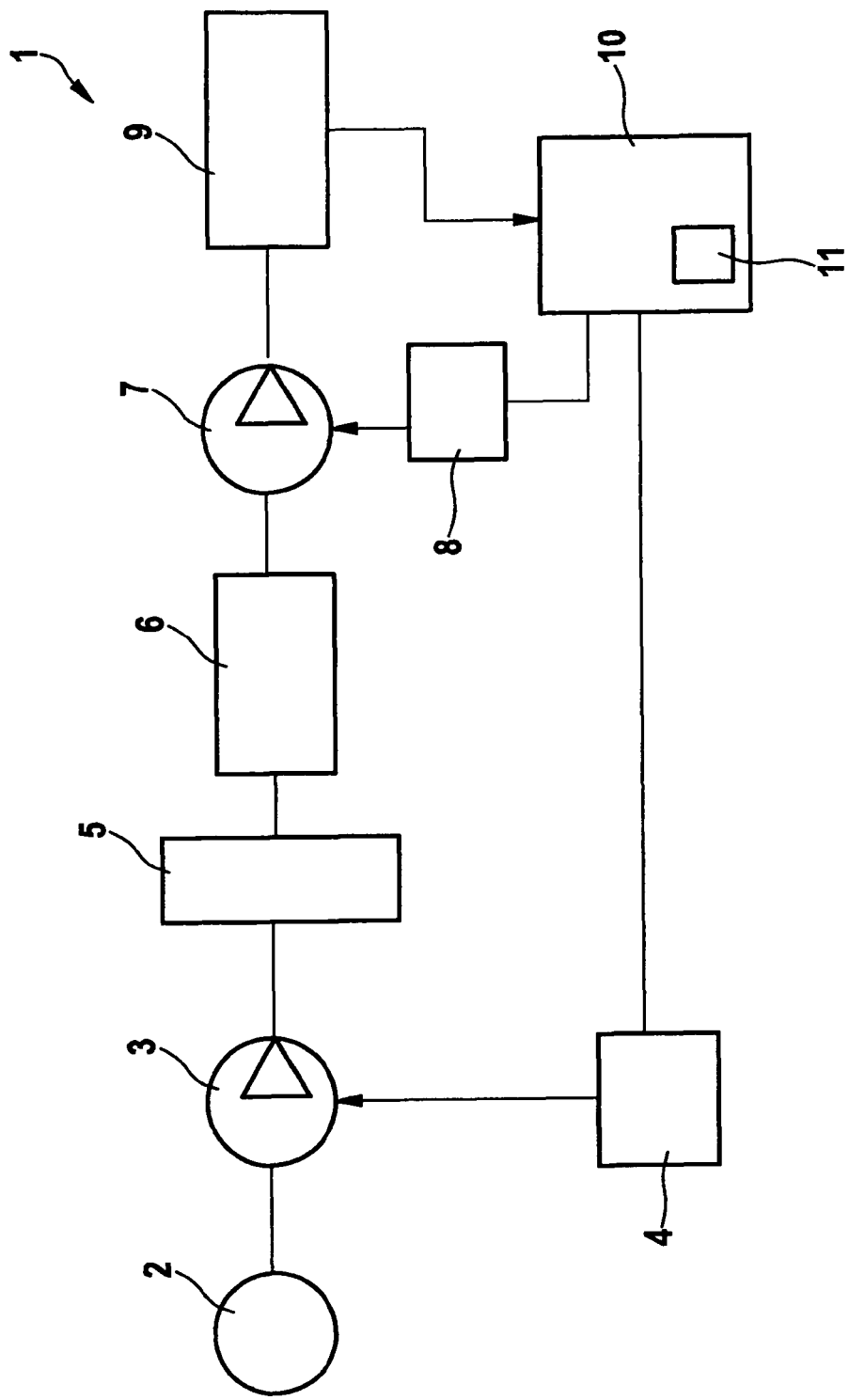
FIG. 1 shows a knock detection system according to an embodiment of the invention.

FIG. 1 depicts a knock detection system 1 that has a knock sensor 2 in order to detect a solid-borne sound signal in a combustion engine. The solid-borne sound signal is an acoustic vibration in the body of the combustion engine, this vibration being detectable with a corresponding vibration sensor. Knock sensor 2 is embodied as an analog sensor, and makes available a sensor signal in the form of an electrical variable such as, for example, voltage or current. Knock sensor 2 can be embodied, for example, as a piezoelectric sensor that furnishes the sensor signal as an oscillating voltage signal.

The analog sensor signal of knock sensor 2 is delivered to a first amplifier 3 that is embodied as a hardware amplifier. First amplifier 3 is embodied either in integrated form in an IC module, or in discrete form on a circuit board as an analog circuit. The gain of first amplifier 3 is adjustable, so that its gain factor varies as a function of a first gain value that is defined by a first gain factor memory element 4.

The sensor signal amplified in first amplifier 3 is delivered to an analog/digital converter 5, appropriately sampled there, and converted into a digital sensor value. The digitized amplified sensor signal is delivered to an evaluation device 6 in which an evaluation of the digitized sensor signal is performed. A bandpass filtering operation can furthermore be performed in evaluation device 6.

The digitized sensor signal is delivered from evaluation device 6 to a second amplifier 7 that is provided as a digital amplifier or software amplifier. A software amplifier corresponds to an amplifier that performs an amplification of the sensor signal by multiplying the value of the digitized sensor signal. The gain factor of second amplifier 7 is defined by a second gain factor memory element 8. The digitized sensor signal amplified in second amplifier 7 is then delivered to a knock detection unit 9, in which knock detection is carried out.

A control unit 10, which adapts the first and the second gain factor in corresponding fashion, is provided for defining the gain factors in the first and the second gain factor memory unit 4, 8. For this purpose, control unit 10 obtains from knock detection unit 9 a level value for a baseline sound sensor signal, which value corresponds to the component of the solid-borne sound signal that is generated in normal operation of the combustion engine without knocking. The gain values of the two amplifiers 3, 7 are adjusted as a function of this level signal.

Figure 2:
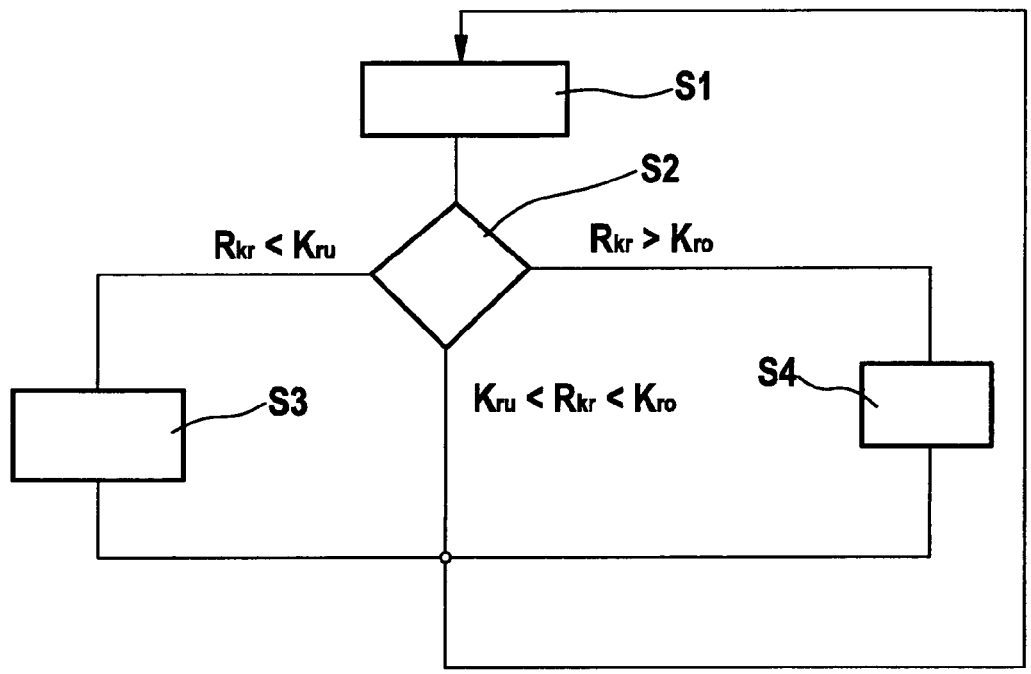
FIG. 2 shows a flow chart to illustrate the method for defining the gain factors for the hardware amplifier and the software amplifier.

In FIG. 2, a flow chart illustrates the manner of operation of control unit 10. In step S1, control unit 10 receives level value Rkr from knock detection unit 9 and, in step S2, checks whether the corresponding level value Rkr is less than a lower threshold value Kru or greater than an upper threshold value Kro, or whether it lies between lower threshold value Kru and upper threshold value Kro. If it is ascertained that level value Rkr lies between the upper and the lower threshold value, the gain factors stored in gain factor memory elements 4, 8 remain unchanged. If it is ascertained that level value Rkr falls below a lower threshold value Kru, the total gain must be increased, and the first and the second gain factor must be correspondingly adapted. Adaptation of the gain factors is accomplished in accordance with a table that can be stored in a memory 11 in control unit 10.

| First gain factor | 4 | 4 | 1 | 1 | 1 |
| Second gain factor | 2 | 1 | 2 | 1 | 0.5 |
| Total gain | 8 | 4 | 2 | 1 | 0.5 |

Examples for implementing total gain values with the aid of first and second amplifier 3, 7 are presented below. The table above shows that first amplifier 3, which is implemented as a hardware amplifier, can effect two gain values, namely a unit gain and a four-fold gain, depending on the first gain factor stored in first gain factor memory element 4. Second amplifier 7 can implement three different gain factors: 0.5, 1, and 2.

The adaptation that results when the level value falls below lower threshold value Kru is performed in step S3 by corresponding lookup in table 11 stored in control unit 10. In step S4, analogously, an adaptation of the first and second gain factors is performed by lookup in table 11 when the level value exceeds upper threshold Kro. The upper and the lower threshold values Kru, Kro are defined so that upon occurrence of a knock in the combustion engine, the knock signal is detected, with reference to the baseline sound sensor signal, in such a way that the amplitude of the knock signal does not either drive first amplifier 3 to saturation or exceed the evaluation range of analog/digital converter 5.

Because evaluation of the energy of the knock signal is essential for knock detection, this ensures that the energy of the knock signal can be ascertained in knock detection unit 9 with sufficient accuracy.

Figure 3:
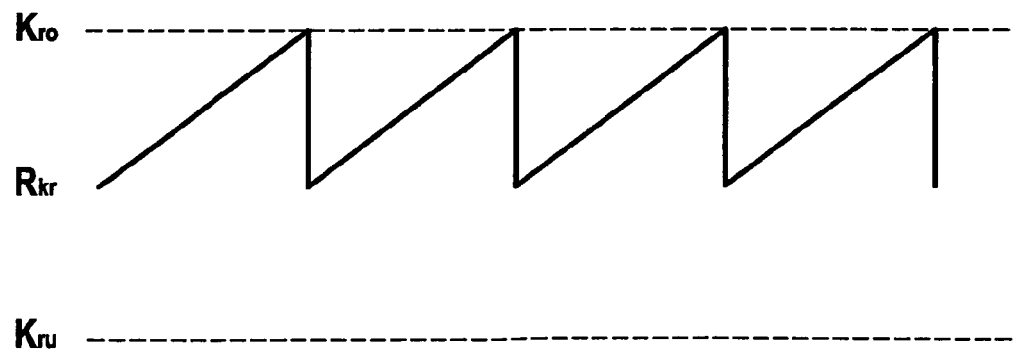
FIG. 3 shows the operation of the amplifier control device with reference to a curve for a reference level ascertained from the amplified sensor signal.

One possible curve for the level value that is furnished to control unit 10 is depicted in FIG. 3 for the case in which the combustion engine is operated at increasing rotation speed. It is evident that the level value rises repeatedly to an upper threshold value Kro. When upper threshold value Kro is reached, the total gain is then reduced as indicated in the table stored in control unit 10. This is made evident in FIG. 3 by the step-like drop in the level value. As the rotation speed increases, the level value then rises again from a level value between the two threshold values Kru, Kro back to the upper switchover threshold.

A comparable behavior with respect to lower threshold value Kru would be observable in the context of a decrease in rotation speed.

The provision of both a hardware amplifier (first amplifier 3) and a software amplifier (second amplifier 7) is considerably more economical, since the hardware amplifier can be of simpler configuration because the number of gain steps that can be set by control unit 10 can be reduced. In the present case, for example, only two gain steps for the hardware amplifier are provided. Software amplifier 7 allows knock detection unit 9 to make available a normalized signal that lies in a value range that is favorable for rapid data processing in knock detection unit 9. Software amplifier 7 can be embodied, together with knock detection unit 9 and control unit 10, by a shared microprocessor and the like. Provision can, however, also be made for the software amplification of second amplifier 7 to be carried out in a unit separate from knock detection unit 9.

What is claimed is:

1. An apparatus for providing an amplified sensor signal of a knock sensor, comprising:
   an analog amplifier to amplify the sensor signal in accordance with a first definable gain factor so as to provide an amplified sensor signal;
   an analog/digital converter to digitize the amplified sensor signal into a digitized sensor signal;
   digital amplifier to amplify the digitized sensor signal in accordance with a second definable gain factor;
   a control unit to provide the first gain factor and the second gain factor as a function of a baseline sound level of the sensor signal, wherein the baseline sound level corresponds to a component of a solid-borne sound signal generated in normal operation without knocking.

2. The apparatus of claim 1, wherein the control unit is configured to select a total gain as a function of the baseline sound level of the sensor signal.

3. The apparatus of claim 2, wherein the control unit is configured to decrease a total gain when the baseline sound level exceeds an upper threshold value, and to increase the total gain when the baseline sound level falls below a lower threshold value.

4. The apparatus of claim 2, wherein the control unit includes a memory having an allocation table with which the total gain can be allocated to the baseline sound level of the sensor signal.

5. The apparatus of claim 1, wherein a first number of defined gain factors are selectable as first gain factors, wherein a second number of defined gain factors are selectable as second gain factors, and wherein a smallest factor occurs between two of the defined first gain factors being greater than the smallest factor occurring between two of the defined second gain factors.

6. A knock detection system, comprising:
   a knock detection unit to detect a knock and to provide a baseline sound level of the sensor signal; and
   an apparatus for providing an amplified sensor signal of a knock sensor, including:
      an analog amplifier to amplify the sensor signal in accordance with a first definable gain factor so as to provide an amplified sensor signal;
      an analog/digital converter to digitize the amplified sensor signal into a digitized sensor signal;
      digital amplifier to amplify the digitized sensor signal in accordance with a second definable gain factor;
      a control unit to provide the first gain factor and the second gain factor as a function of a baseline sound level of the sensor signal, wherein the baseline sound level corresponds to a component of a solid-borne sound signal generated in normal operation without knocking.

7. A method for providing an amplified sensor signal of a knock sensor for operating a knock detection system, the method comprising:
   providing a sensor signal;
   amplifying the sensor signal in accordance with a first definable gain factor so as to provide an amplified sensor signal;
   digitizing the amplified sensor signal into a digitized sensor signal;
   amplifying the digitized sensor signal in accordance with a second definable gain factor; and
   providing the first gain factor and the second gain factor as a function of a baseline sound level of the sensor signal, wherein the baseline sound level corresponds to a component of a solid-borne sound signal generated in normal operation without knocking.

8. The method of claim 7, wherein a total gain is selected as a function of the baseline sound level of the sensor signal, wherein the total gain is decreased when an upper threshold value is exceeded, and wherein the total gain is increased when the level falls below a lower threshold value.

9. A non-transitory computer readable medium having a computer program, which is executable by a processor, comprising:
   a program code arrangement having program code for providing an amplified sensor signal of a knock sensor for operating a knock detection system, by performing the following:
      providing a sensor signal;
      amplifying the sensor signal in accordance with a first definable gain factor so as to provide an amplified sensor signal;
      digitizing the amplified sensor signal into a digitized sensor signal;
      amplifying the digitized sensor signal in accordance with a second definable gain factor; and
      providing the first gain factor and the second gain factor as a function of a baseline sound level of the sensor signal, wherein the baseline sound level corresponds to a component of a solid-borne sound signal generated in normal operation without knocking.

* * * * *

UNITED STATES PATENT AND TRADEMARK OFFICE
CERTIFICATE OF CORRECTION

PATENT NO. : 8,365,579 B2  Page 1 of 1
APPLICATION NO. : 12/733991
DATED : February 5, 2013
INVENTOR(S) : Dierssen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this
First Day of September, 2015

Michelle K. Lee
*Director of the United States Patent and Trademark Office*